United States Patent
Sharony (10) Patent No.: US 6,577,609 B2
(45) Date of Patent: Jun. 10, 2003

(54) LOCAL ADDRESSING OF MOBILE UNITS IN A WLAN WITH MULTICAST PACKET ADDRESSING

(75) Inventor: Jacob Sharony, Dix Hills, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 09/834,347

(22) Filed: Apr. 13, 2001

(65) Prior Publication Data

US 2002/0150098 A1 Oct. 17, 2002

Related U.S. Application Data

(60) Provisional application No. 60/249,055, filed on Nov. 15, 2000, provisional application No. 60/243,352, filed on Oct. 25, 2000, and provisional application No. 60/236,979, filed on Sep. 29, 2000.

(51) Int. Cl.[7] .................................................. H04J 3/24
(52) U.S. Cl. ..................... 370/312; 370/390; 370/473
(58) Field of Search ................................ 370/338, 401, 370/420, 463, 432, 466, 474, 311–312, 389–390, 473

(56) References Cited

U.S. PATENT DOCUMENTS

| | | | | |
|---|---|---|---|---|
| 5,621,732 A | * | 4/1997 | Osawa | 370/346 |
| 5,907,544 A | * | 5/1999 | Rypinski | 370/337 |
| 5,940,771 A | * | 8/1999 | Gollnick et al. | 370/311 |
| 6,049,549 A | * | 4/2000 | Ganz et al. | 370/449 |
| 6,097,720 A | | 8/2000 | Araujo et al. | 370/355 |
| 6,240,472 B1 | * | 5/2001 | Hu | 710/72 |
| 6,269,080 B1 | * | 7/2001 | Kumar | 370/236 |
| 6,301,229 B1 | * | 10/2001 | Araujo et al. | 370/252 |
| 6,304,558 B1 | * | 10/2001 | Mysore | 370/312 |

OTHER PUBLICATIONS

Lorenzo Aguilar, Datagram Routing Internet Multicasting, SRI International Menio Park, California 94025, (1984).*
Aguilar, "Datagram Routing for Internet Multicasting", SRI International, Menlo Park, California 94025 (1984).
Graff, "IPv4 Option for Sender Directed Multi–Destination Delivery", US Army CECOM (Mar. 1995).
Northwestern University Information Technology, Mission & Projects, Small Group Multicast (SGM), http://www.ic-air.org/main_projects_infrast_sgm.html, printed from Internet Aug. 6, 2001.

* cited by examiner

Primary Examiner—Melvin Marcelo
Assistant Examiner—Inder Pal Mehra
(74) Attorney, Agent, or Firm—Fish & Richardson P.C.

(57) ABSTRACT

In a wireless local area network, a method and apparatus for providing a multicast address data packet from a single access point to one or more mobile units coupled to the access point is disclosed. A data frame packet is formed containing two or more data packets, each packet targeted for different mobile units having unique unicast addresses. The data frame is transmitted to the mobile units and each of the mobile units derives the proper data intended for it from the data packets, by examining the unicast addresses of each packet.

9 Claims, 10 Drawing Sheets

LOCAL ADDRESSING OF MOBILE UNITS IN A WLAN WITH MULTICAST PACKET ADDRESSING

This application claims priority to U.S. Provisional Applications Nos. 60/249,055, filed on Nov. 15, 2000, 60/243,352, filed on Oct. 25, 2000, and 60/236,979, filed on Sep. 29, 2000.

FIELD OF THE INVENTION

This invention relates to wireless local area networks, and more particularly to a method and apparatus for using multicast packet addressing for use by base stations in wireless local area networks communicating with wireless local mobile units.

BACKGROUND OF THE PRIOR ART

Wireless local area networks (WLANs) use infrared (IR) or radio frequency (RF) communications channels to communicate between portable or mobile computer terminals and stationary access points or base stations. These access points are connected by a wired or wireless communication channels to a network infrastructure which connects groups of access points together to from a local area network (LAN), which can include one or more host computers. In turn, the LAN can be connected to another larger network such as the Internet and the World Wide Web (Web). Several protocols, including the IEEE 802.11 standard, "Wireless LAN Medium Access Control (MAC) and Physical Layer (PHY) Specifications" (as in place on the filing date of this application) have been designed to standardized WLAN communications. Such standardization is useful for optimizing user requirements, including spatial layout, response time, loading and throughput requirements of the network.

"Roaming" terminals are mobile units that can associate with any access points (AP) associated with a WLAN and seamlessly move from AP to AP. Each roaming terminal analyzes received signals from access points in its vicinity and associates with a single access point. Communication with an access point connects a terminal with the LAN and therefore with external networks such as the Internet. The region around an access point can be referred to as a "cell". Roaming terminals can move from cell to cell and remain connected to the LAN and any other network to which the roaming terminal has connected.

A mobile unit user typically roams from one AP to another AP. It takes a certain delay period for the mobile unit to be associated with the new AP before the mobile unit is able to receive data packets. During this delay period, the user will experience a disruption of communication because an association with the new AP has not yet been established. The disruption causes data packets to be lost or become useless due to the time lost during the association period. While this disruption is acceptable for non real time services such as data file transfer, it is not acceptable for real time services such as real time video or phone conversations.

The number of simultaneous telephone conversations that can be handled between a single access point and multiple mobile units within range and associated with the AP is limited by the processing speed of the AP. Since conventional APs may not distinguish traffic classes (e.g. voice and data traffic), packet delay on voice traffic channels may result in degraded quality of service.

Streaming multicast video systems send a video stream to a multicast group of computers using a specific compression rate. These systems currently lack the ability to scale up or down the bit-rate according to the connection speed available and/or computing power of the receiver. This may result in inefficient bandwidth utilization because the source would have to send multiple multicast streams to each homogenous group of computers.

When a mobile phone user, having a fixed IP address, roams to a foreign subnet, they cannot be located since they have left the home subnet. In current mobile IP systems, the calling party communicates with the mobile computer through the mobile's home subnet. Although the subnet knows the location of mobile, there is an unacceptable time delay. While this may be acceptable in non real-time services such as file transfer, it is not acceptable in real-time services, such as voice, since the long time delay causes the phone conversation to become non-interactive.

Although the applications described above relates to multicasting as applied to layer 2 or MAC addresses associated with communications over a wireless link of a network, the same concepts can be applied to the wired segments of the network and layer 3 or IP addresses. By way of background, it is useful to discuss the framework associated with communications between APs, such as that considered by IEEE P802.11 Task Group f as part of the evolving IEEE P802.11 standard. One issue is the requirement that stations must have a layer 3 address that is local with respect to the layer 3 address of the AP, e.g., the station must have an IP address that is valid in the subnet in which the AP is operating. How the station obtains this local address is immaterial to the AP and the inter access point protocol. A station might perform a DHCP renew on reassociation, or it might be running operating under Mobile IP. Knowing that all the stations in a BSS will have local layer 3 addresses reduces the complexity of the task of delivering frames for the stations via the wired network or distribution system. That task can now be done by the normal routing functions available to any station on the subnet. How a message is distributed with the Distribution System Service, as defined in the IEEE 802.11 standard.

The requirement that the station have a local layer 3 address is problematic with respect to any long-lived TCP connection which would be lost when the station moved from one subnet to another, unless Mobile IP is used. However, in most of today's applications, the connections are not long lived. Examples of applications that might be adversely affected (without Mobile IP) are FTP and Telnet.

SUMMARY

The invention relates to a method of operating a data communications network including a plurality of mobile or stationary access points and optionally at least one host computer connected to said access points, and a plurality of remote mobile wireless units, at least some of the mobile units being capable of communicating with at least one of the access points when located within a predetermined range there from and being normally associated with and in communications with a single one of such access points, each mobile unit having a unique user address. The invention provides establishing communication and association between the mobile units and the access points utilizing a packet frame addressing protocol including a multicast address; receiving in one of the access points at least two distinct sequences of packets addressed to at least two mobile units respectively associated with the access point; forming a frame, with a multicast address including the addresses of the at least two mobile units, in the access point and including in the data field of said frame unicast packets addressed to each of the at least two mobile units; and transmitting the frame to the mobile units by the one access point.

Another aspect of the invention relates to a method and system for managing transparent roaming in a wireless LAN system using multicast IP. By using multicast IP to establish an association between a mobile unit and an AP, a mobile unit is able to roam from one cell to another without experiencing a disconnection or delay in communication from packet to packet.

In yet another aspect of the invention, a method and apparatus is disclosed for distributing and updating software in a mobile unit wireless LAN using multicast IP. The software is transmitted throughout the network using a multicast IP address, and any mobile unit on the network receives the information by simply "tuning" into the IP address at its own convenience.

In another aspect of the invention, a method and apparatus is disclosed for streaming multicast scalable video to heterogeneous computers in a wireless LAN. The source transmits multiple bit rate video streams to computers with different bit-rate requirements. Each computer is able to reconstruct the video stream according to its own requirements.

In another aspect of the invention, a wireless LAN using multicast IP is configured for managing mobile phones. The IP address of a mobile unit at a home AP is mapped to a multicast IP address, the mobile unit roams to a foreign AP, a user calls the mobile unit using the IP address related to the home AP, the mobile unit receives the IP request, and the mobile unit transmits back the new IP address that it was assigned when it roamed to the foreign AP.

The details of one or more embodiments of the invention are set forth in the accompanying drawings and the description below. Other features, objects, and advantages of the invention will be apparent from the description and drawings, and from the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
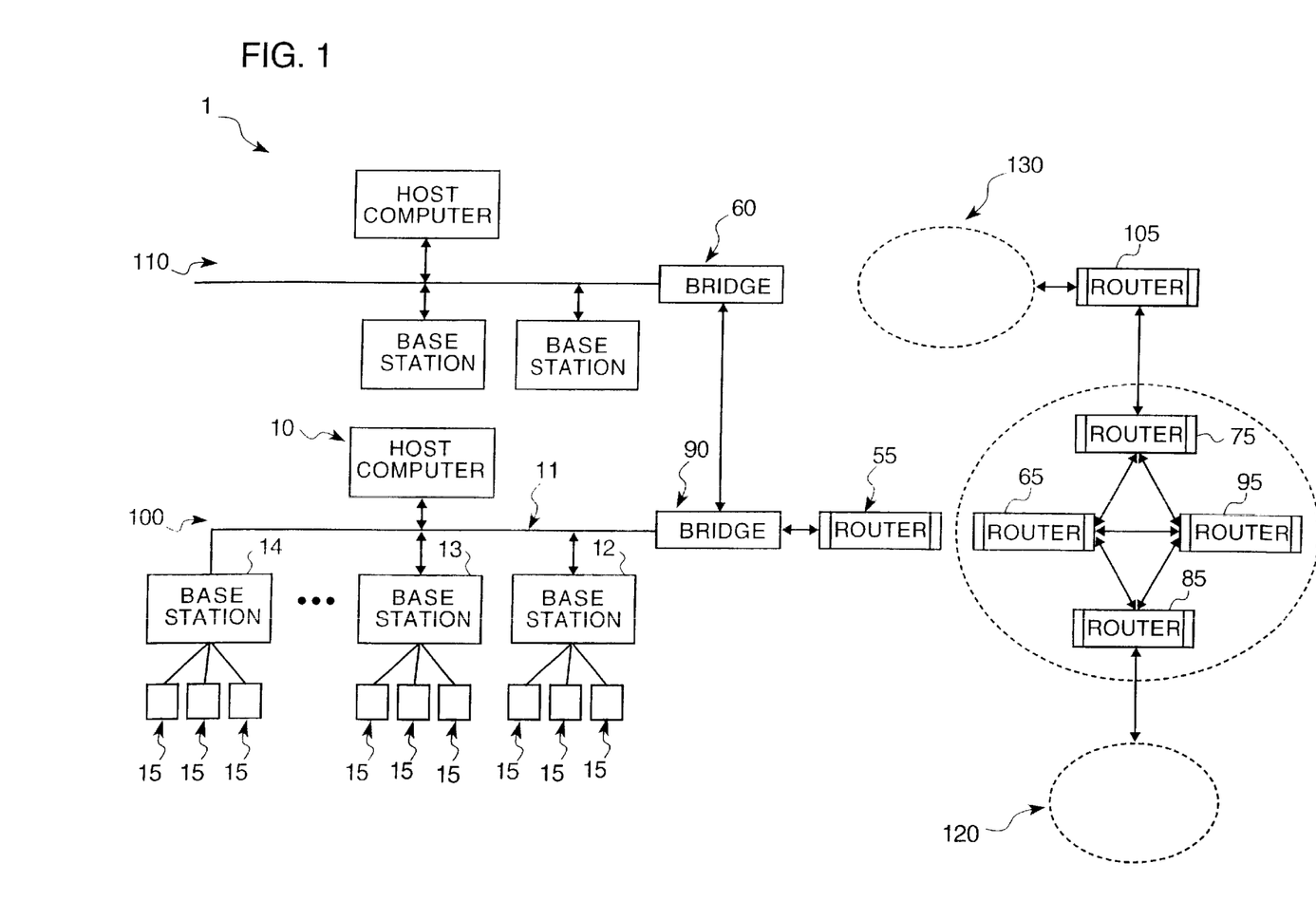
FIG. 1 illustrates a network environment in which the present invention operates.

FIG. 1 illustrates an exemplary network environment 1 having numerous nodes. A first LAN 100 includes a host processor 10 connected by a wired communications link 11 that is connected to a number of stationery access points or base stations 12, 13. In one embodiment, communications link 11 can be a serial or parallel type port such as RS-232, general-purpose interface bus (GPIB), USB or any other similar bus. In LAN applications, the link 11 can be Ethernet, token ring or any other network protocol. Another base station 14 can be coupled to the host through the base stations 12, 13 or by a radio frequency (RF) link. Each one of the base stations 12, 13, 14 is coupled to a number of mobile units 15. The mobile units can be any of a variety of hand held units such as battery operated laser scanning bar code reader data terminals, or voice or audio communications devices or both. Various other types of remote terminals can be employed in the network environment, including data entry facilities such as keyboards, keypads, and the like, as well as a display or a printer for indicating to a user information detected, transmitted and/or received by the terminal 15.

The network may have a large number of base stations, typically up to sixty-four, and several hundred remote units 15. Furthermore, the first LAN 100 may be coupled to additional LANs 110, 120, 130 through controllers such as bridges 50, 60, or routers 55, 65, 75, 85, 95, 105. Other typical embodiments for the remote units 15 as a WLAN adapter include but are not limited to hand-held devices for network access to enable a user to receive personal itinerary such as airline e-tickets, hotel confirmation information, credit card, bank account or brokerage account access and the like.

This network environment of FIG. 1 can also be used for any facility having the need for a number of remote units to access a central control station such as a LAN 100. Such facilities can be but are not limited to a manufacturing facility, office building complex, warehouse, retail establishment, or like commercial facilities, or combination of facilities where bar code readers, for example, or similar data-gathering terminals are used for inventory control in stockroom or receiving/shipping facilities, at check out (point of sale) counters, for reading forms or invoices or the like, for personal security checking at gates or other checkout points, at time clocks, for manufacturing or process flow control, and other similar uses. Although hand-held laser-scan type bar-code readers are a preferred example, the remote units 15 may also be bar-code readers of the wand-type, and may be stationary rather than hand-held. The device may be of the optical character recognition (OCR) type as well. Other types of data gathering devices may implement these features, such as temperature or pressure measuring devices, event counters, voice or sound activated devices, intrusion detectors and the like.

Figure 2:
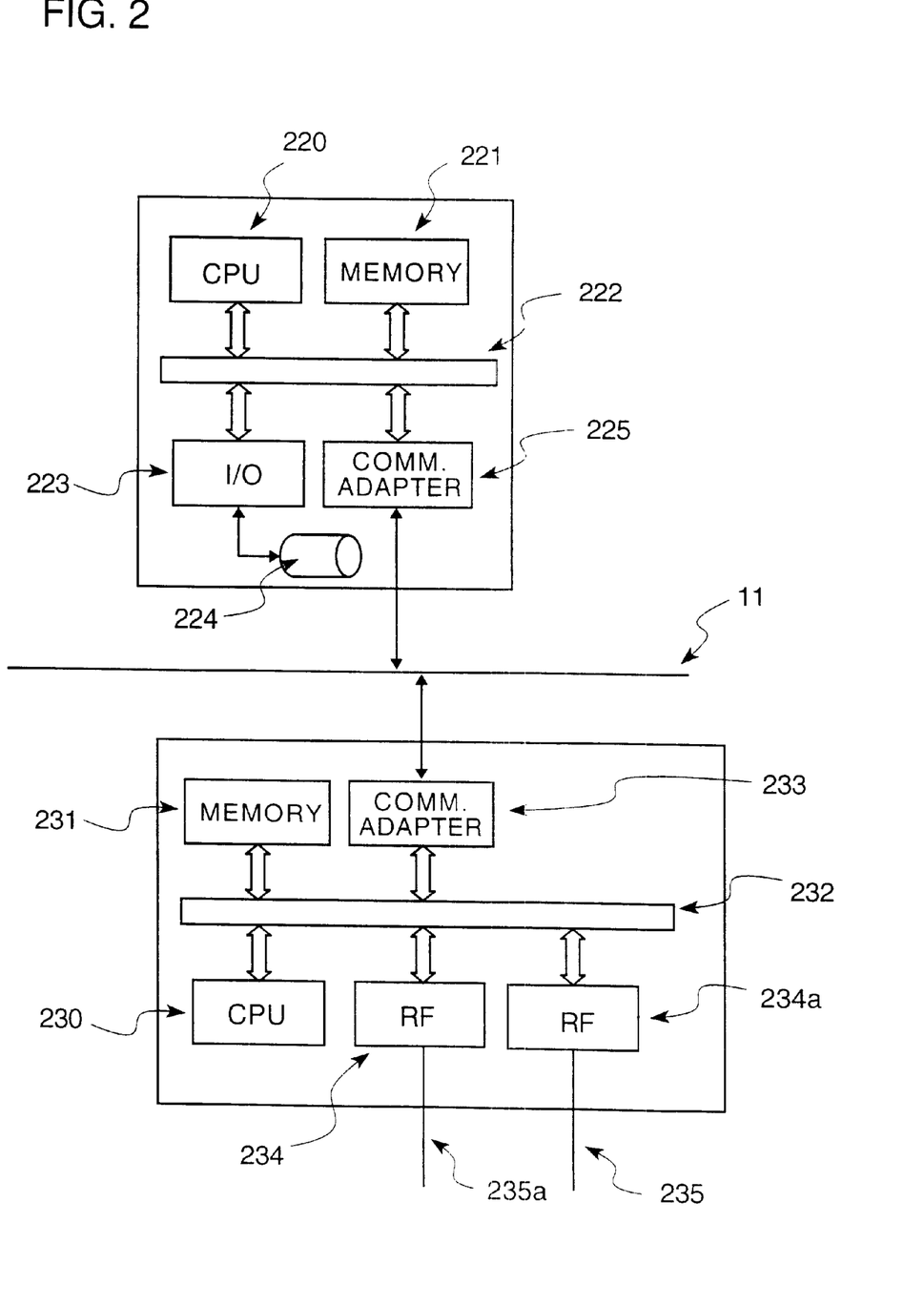
FIG. 2 illustrates a block diagram of a host computer and a base station in the network.

FIG. 2 illustrates a detailed view of a host computer 10 and a base station 12, 13 14 of FIG. 1. The host computer 10 includes a central processing unit (CPU) 220 that is connected to a memory 221 through a bus 222. An I/O module 223 connects the host computer to various devices such as a keyboard, video display and other peripherals. Disk storage 224 is connected to the I/O modules 223. A communications adapter 225 connects the CPU 20 through the bus 222 to the communications link 11.

The base stations 12, 13, 14 each utilize a CPU 230 connected to a memory 231 through a bus 232. A communications adapter connects the bus 232 to the communications link 11. An RF transceiver 234 is connected to the CPU 230 in each base station 12, 13, 14 through the local bus 232 and is connected to an antenna 235 for RF transmission and reception from the remote units 15 using a transmit/receive exchange protocol. In one embodiment, the exchange protocol is similar to a collision-sense multiple access (CSMA). A detailed discussion of this exchange protocol is discussed below with respect to FIG. 3. An additional RF transceiver 234a can be used as an RF link to and from other base stations, if necessary.

Base stations 12, 13, 14 are typically stationary units that use line power and often not accessible to an operator. The RF signal path in a typical environment is changeable because equipment in the environment may move around as well as the locations of the remote units 15. As a result, the particular base station that is in communication with the remote unit 15 can change. In an implementation, a "hand-off" protocol is used to change the base station which is designated to communicate with the remote unit 15. In this manner, a remote unit 15 has a confirmed virtual link with only one base station at a time, although other base stations may be in range. The base stations 12, 13, 14 act as intermediaries for the communication link between the remote unit 14 and the host computer 10. The main function of the base stations 12, 13, 14 are to relay data between the remote units 15 and the host computer.

Figure 3:
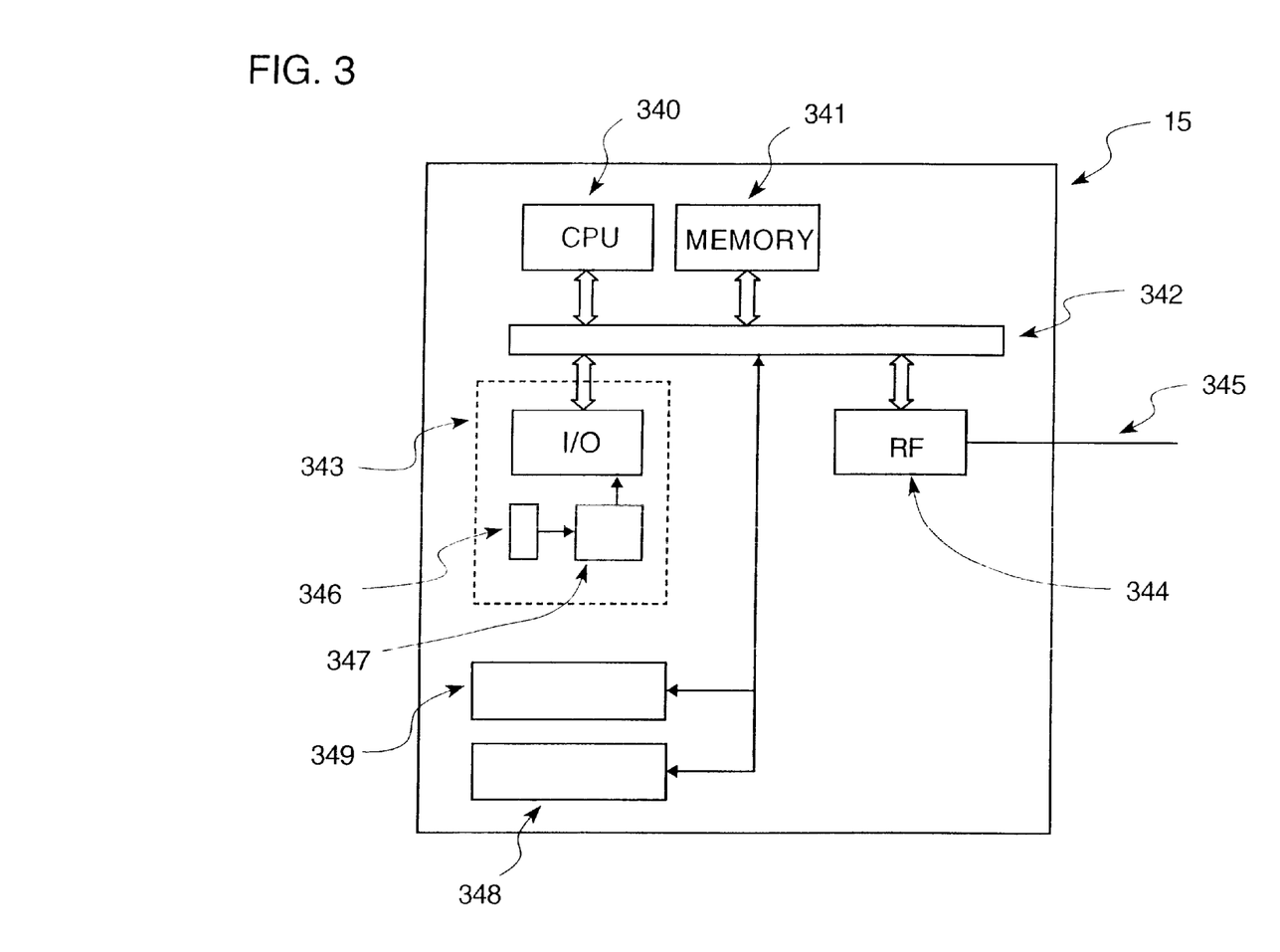
FIG. 3 illustrates a block diagram view of a mobile unit.

FIG. 3 illustrates a detailed view of a remote unit 15. The remote unit 15 includes a CPU 340 connected to a local bus 342. A memory 341 is also connected to the local bus 342, and can provide instructions to the CPU 340. A peripheral bar code data acquisition device 343 is optionally coupled to the CPU via the bus 342. The device 343 can be used to detect and/or convert data from a bar code (not shown). The device 343 can be used to input data from a photo detector device 346 that produces a serial electrical signal fed to a code recognition circuit 347 responding to the characteristic patterns of bar code symbols and providing bar code data to the memory 341 via device 343 when a bar code is scanned. The bar code data can be moved to memory by a variety of techniques such as direct memory access (DMA) or CPU instructions. Ultimately the bar code data is transferred to an RF transceiver 344 for transmission to the base unit 12, 13, 14 and ultimately the host computer 10. The RF transceiver 344 is coupled to and controlled by the CPU through the bus 342, and transmits the ceded RF signal through an antenna 345 or detects and converts RF signals received by the antenna 345.

Typically, the remote unit 15 has a manual entry device 348 such as a keyboard, and a visual display 349 such as an liquid crystal display (LCD) device. The elements of the entry device 348 and the display 349 are scanned by signals generated in the CPU 340, or generated in an entry device and display I/O controller. In one embodiment, the I/O controller is an Intel® 8052 micro controller.

As discussed above, in one embodiment, a transmit/receive exchange protocol is used by the remote unit 15 to communicate with the base units 12, 13, and 14. The exchange protocol is similar to a collision-sense multiple access (CSMA). The remote unit 15 first listens before transmitting, and does not transmit if the channel is not free. If an RF channel is quiet a transceiver in the remote unit 15 starts a transmission. A transceiver in the remote unit 15 typically begins a data exchange at its own initiative by first listening for other traffic for a brief time interval $t_0$, and, if the RF channel is quiet, starting a transmission at a time of its own selection. An outgoing transmission data packet lasts for a certain time interval $t_1$, then at a precise time delay $t_2$ the mobile unit 15 starts its transmission, the transceiver 344 begins listening for a return data packet from the base stations 12, 13, 14. The remote unit 15 waits for a very small time interval $t_3$ for this return, or "acknowledge" packet. If this packet is not returned during this time interval $t_3$, the remote unit 15 ignores any data packets that follow. Because the mobile units 15 control the data exchange between the remote units 15 and the base stations 12, 13, 14, the CPU 340 handles all exchange related tasks including data input from the bar scanner 343, keyboard and display scans, RF control, data stream transfers to and from the RF, and data coding and encoding. The remote unit 15 is therefore the primary controller of RF transmission and reception. The remote units 15 send a periodic data packet with no data to the base stations 12, 13, 14 in case the base stations 12, 13, 14 have data to transmit to the remote units 15.

As discussed above, the mobile unit 15 can be a portable computer. The portable computer can be used for a variety of computing purposes including but not limited to Internet access, word processing, scheduling, mathematical computation, and the like. For these purposes, the portable computer is loaded with an operating system. In an embodiment, the operating system can be all Windows 9x and NT platforms. In other embodiments, the operating system can be Windows 95, Windows 98 and Windows 2000 at Windows CE, Palm 05, Linux, or others. In one embodiment, the memory 341 can be random access memory into which the operating system is loaded. In another embodiment, the memory 341 can be any type of firmware such as EPROM or EEPROM into which the operating system is "burned".

Figure 4:
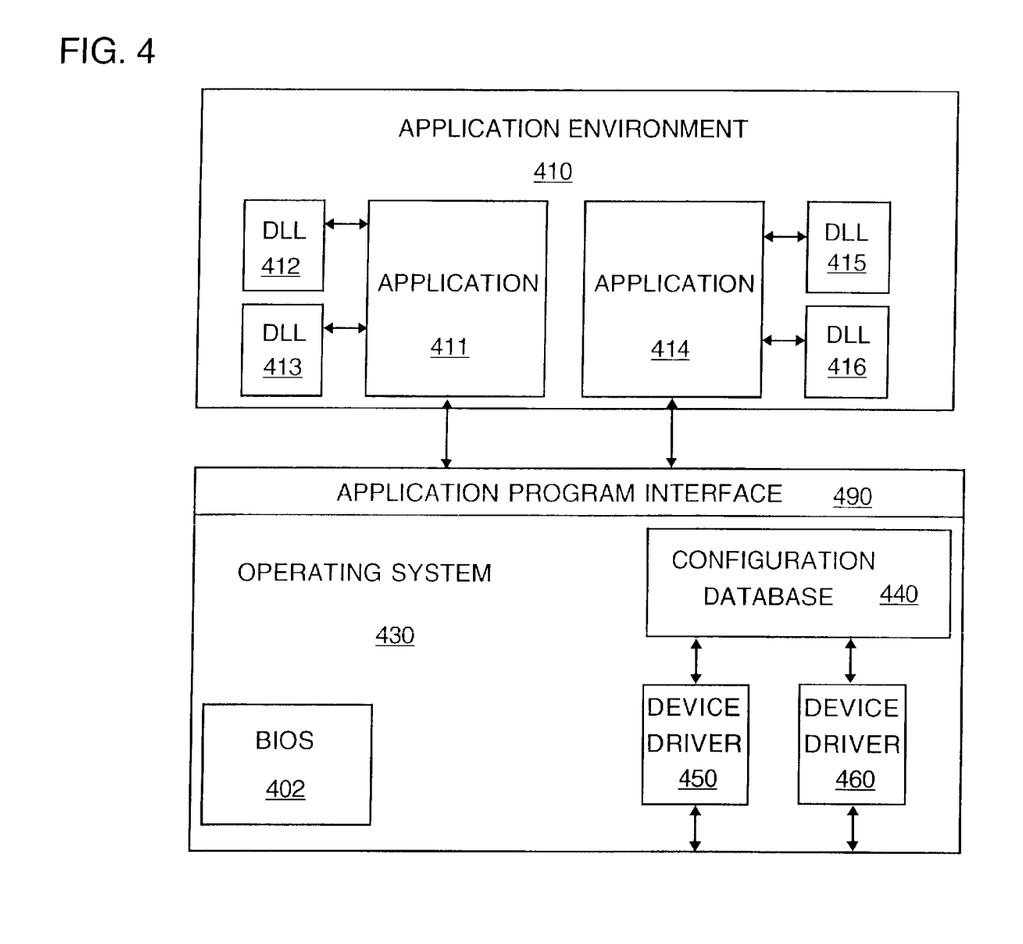
FIG. 4 illustrates an operating system having an application environment.

FIG. 4 illustrates an operating system having an application environment. As discussed above, the operating system 430 can be any one of the various Windows environments. The operating system 430 provides software to mange configure, enable and allocate physical resources of the mobile unit 15. For example, the operating system 430 may include a memory allocation algorithm to allocate the memory 341 among various software tasks. Additionally, the operating system includes instructions from the memory to control the RF transmissions and receptions, as well as data flow between the code data acquisition device 343 and the RF transceiver 344.

An application environment 410 contains one or more software application processes 411, 414. Each application 411, 414 may have a dynamic link library (DLL) 412, 413 and 415, 416 respectively associated with it. A DLL is a feature of Windows® platform that allow executable code modules to be loaded on demand and dynamically, and linked at run time. Library code can be updated, transparent to the applications 411, 414, and unloaded when no longer needed.

The operating system 430 can include an application-programming interface 490 (API), such as the Winsock API. The API 490 is the software that the application processes 411, 414 use to request and carry out lower level services performed by the operating system 430. For Windows®, the API also helps applications 411, 414 manage windows, menus, icons and other graphical user interface (GUI) elements. The API 490 includes a set of standard software interrupts, calls and data formats that applications 411, 414 use to initiate contact with device drivers 450, 460.

The operating system 430 can include one or more device drivers 450, 460. The device drivers 450, 460 provide control functionality specific to a particular physical device or class of devices. Additionally, the device drivers 450, 460 provide standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred from operating system 430 to the RF transceiver 344 through device driver 460. Operating system 430 also includes a BIOS 402 to run standard start up routines for the remote unit 15.

This WLAN adapter can be used in a single WLAN having base stations 12, 13, 14, or the adapter can be used for multiple unrelated WLANs having multiple unrelated base stations.

Addressing techniques in the context of packet or frame structure in packet based communication networks is well known. A packet which is addressed to a single destination network unit, designated by a unique address, is known as unicast addressing. A packet which is addressed to all network units is known as a broadcast address.

Multicast is a form of broadcast addressing in which packets are delivered to a specified subgroup of addressable network units. For example, in the Ethernet (IEEE 802.3) protocol, an Ethernet address consisting of all 1s is treated as a broadcast address; frames addressed to the broadcast address are accepted by all units on the network. Similarly, an address that has the first bit set to 1, but the other bits are not the broadcast address, is denoted a multicast address.

The current Internet Protocol is version 4, but the present invention is not limited to that version; the proposed Internet Protocol version 6 (IPv6) is an evolutionary set of improvements over the previous versions, and is also within the scope of the present invention. In particular, it supports three types of addressing in a packet communications network. In the unicast type, the communication is between a single sender and a single receiver over a network. In the multicast type, the communication is between a single sender and multiple receivers. Finally, in the anycast type, communication is between a single sender and the nearest of several receivers in a group.

Figure 5:
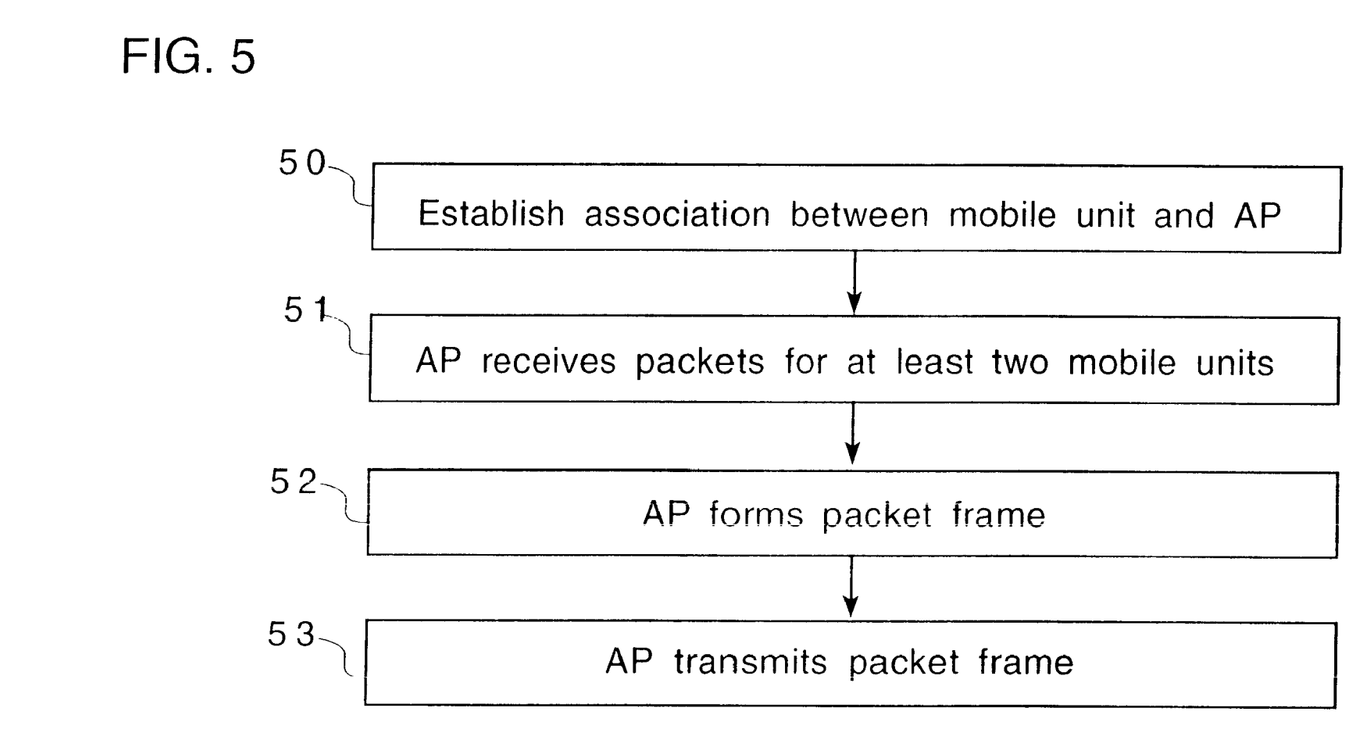
FIG. 5 illustrates a process flow diagram of an implementation of a multicast packet addressing method.

One aspect of the invention is shown in FIG. 5 as a high level flow diagram illustrating one embodiment of a method of operating a packet communications network including at least one access point and a plurality of remote or mobile wireless units. This method utilizes the multicast packet-addressing scheme that overcomes the drawbacks of individual addressing which leads to gaps in transmission.

At block 500, the invention provides that two of the mobile units 15 become associated with the access point AP and transfer packets of data thereto destined for other mobile units. At block 510, at least two distinct sequences of packets addressed to at least two mobile units are received at the single access point.

At block 520, a multicast packet frame is formed at the access point with data from both the sending mobile units. The packet frame consists of a multicast address that represents the group including the address of the destination mobile units. The packet frame includes a data field that includes unicast packets with an address of each of the at least two destination mobile units. At block 530, the multicast packet frame is transmitted so that the at least two mobile units receive the transmission.

At each mobile unit, the gain in capacity for telephone or voice exchanges is possible because the AP is packet and not bandwidth limited for voice packet processing. It can be shown that if we pack K voice packets into one multicast packet, the number of phone calls within a wireless cell can increase 2K/(K+2) fold. Practically a 75% increase or more could be achieved. Since in IEEE 802.11, multicast packets are not acknowledged every such "large" packet is sent twice to guaranty delivery. Note that all ACK's from the phones to the AP are eliminated and the AP does not have to contend for access for each small voice packet it sends. These savings in packet count and contention for the channel compensate for the small delay penalty at the AP due to the packing process.

Figure 6:
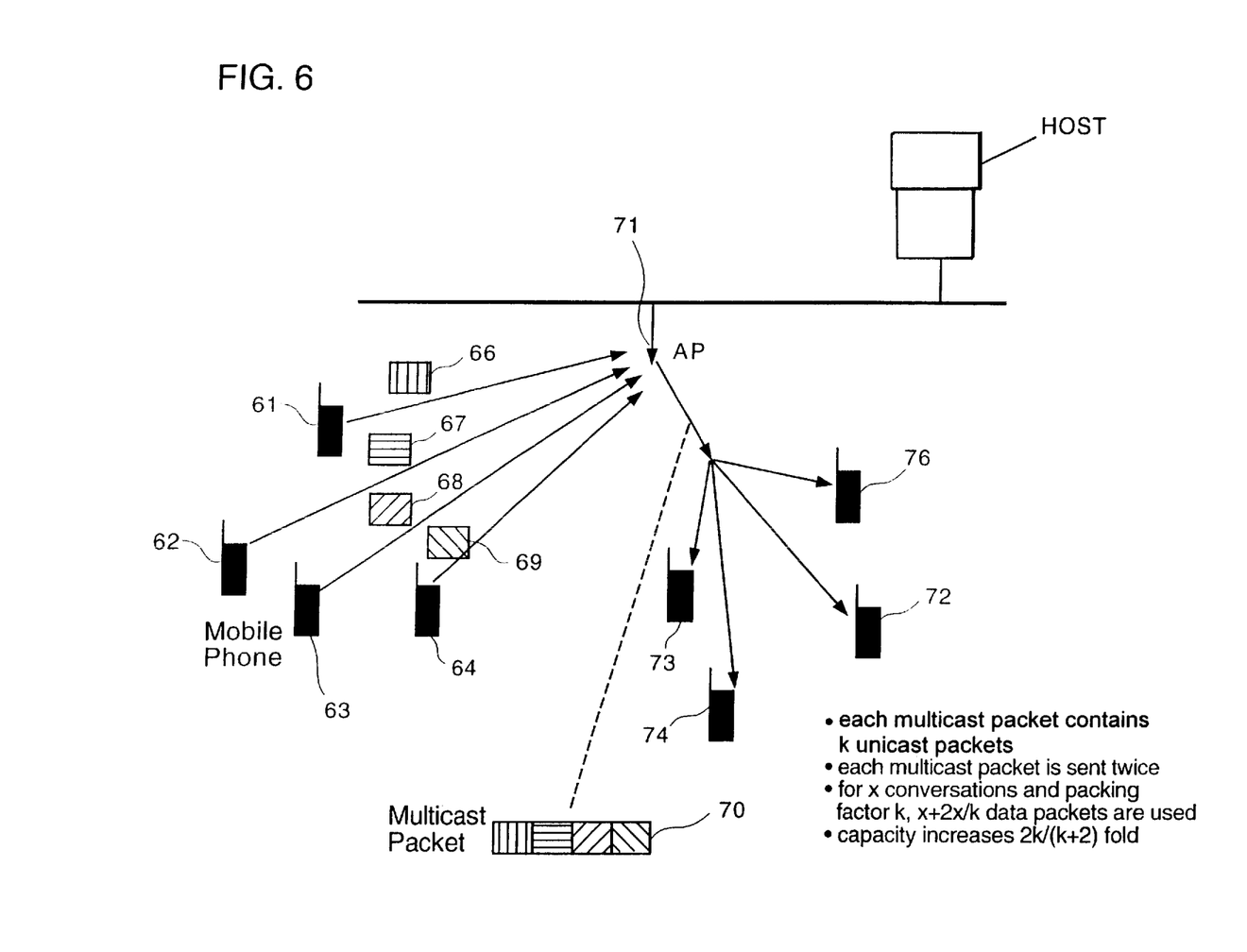
FIG. 6 illustrates a block diagram of the formation of a multicast packet from different sources.

FIG. 6 illustrates the formation of a multicast packet, 70 in highly diagrammatic form, from multiple sources 61, 62, 63, and 64 each transmitting a unicast packet 66, 67, 68, and 69, respectively to the AP 71.

Figure 7:
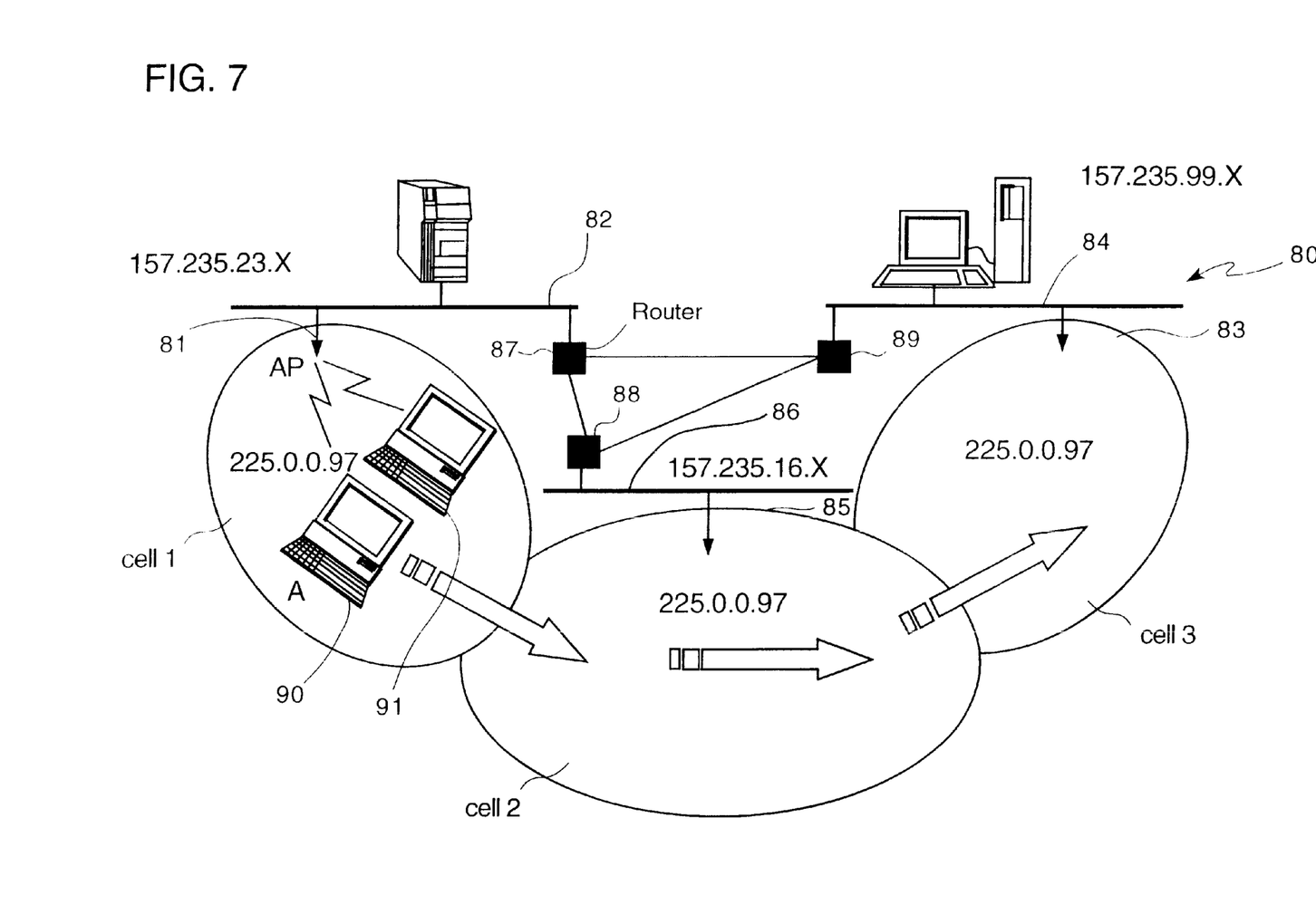
FIG. 7 illustrates a block diagram of a wireless LAN network using multicast Internet Protocol (IP) configured for managing transparent roaming of mobile units.

A second aspect of the invention is shown in FIG. 7 as a block diagram of a network 81 that illustrates the invention using multicast IP that enables mobile units 91, 92 to roam transparently from one AP 81 on one LAN 82 to another AP 83 on another LAN 84 while transversing AP 85 on LAN 86. Routers 87, 88 and 89 interconnect the LANs 82, 84 and 86. The mobile unit is able to roam to a new AP without experiencing a disruption due to the time delay during the association period. The association period is the time wireless LAN needs in order to establish an association between the new AP and the mobile unit. Since the data packets are transmitted using multicast IP, both the new AP 83 and the old AP 81 receive the multicast data packets. As illustrated in FIG. 7, the mobile unit in subnet 157.235.23.X receives multicast IP packets 225.0.0.97 while it is within the range of cell 1. At the same time, the data packets are transmitted to subnet 157.235.16.X. and an association is established for the mobile unit with AP 85. As the mobile unit roams to a new location within the range of cell 2, which is part of subnet 157.235.16.X, it will receive the 225.0.0.97 data packets without experiencing a disruption, since an association with subnet 157.235.16.X was previously established. Similarly, as the mobile unit roams to cell 3 it will be likewise receive the 225.0.0.97 data packets.

Figure 8:
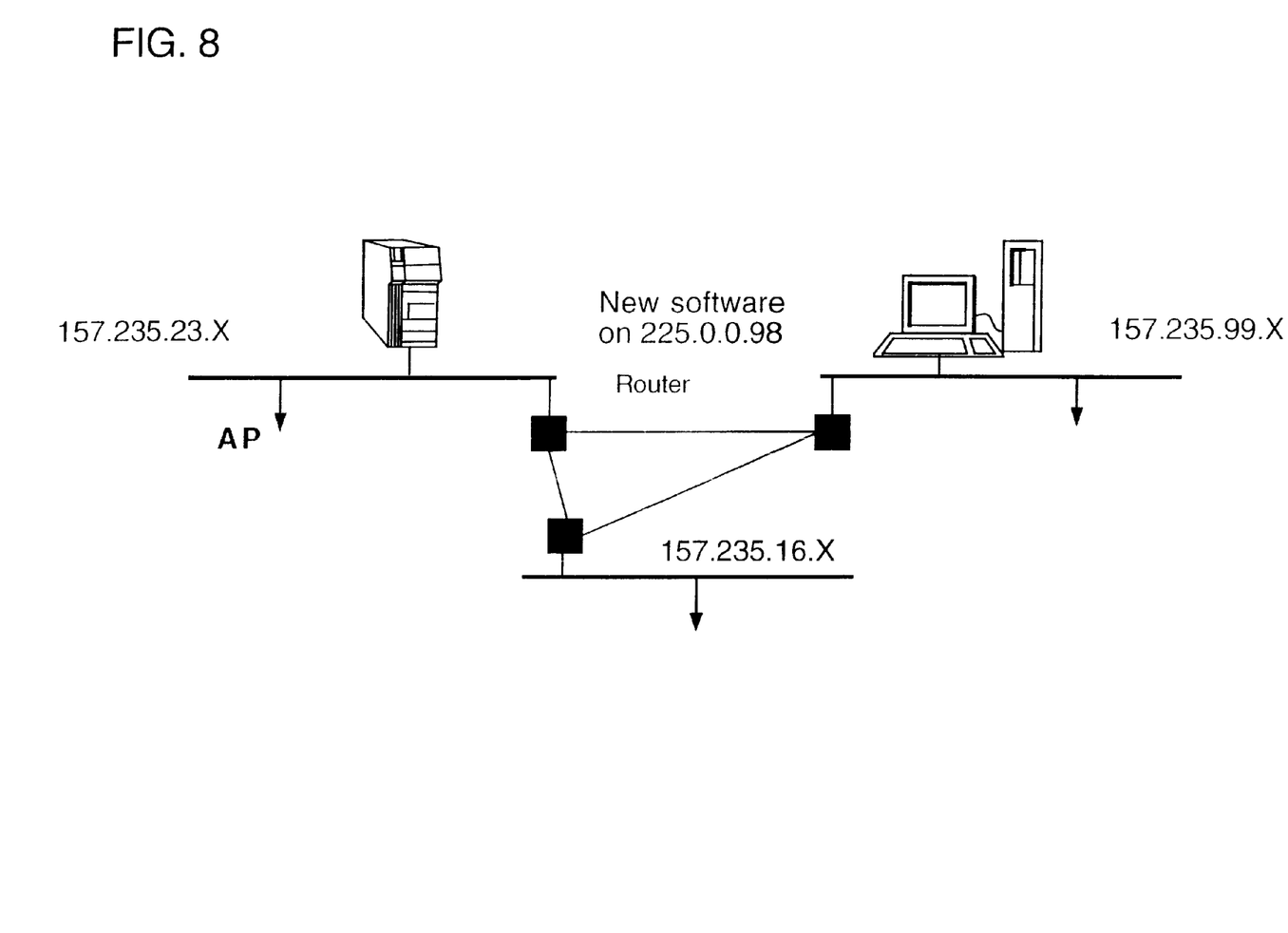
FIG. 8 illustrates a block diagram of a wireless LAN system using multicast Internet Protocol (IP) configured for distributing and updating software.

A third aspect of the invention is shown in FIG. 8 as a block level diagram that illustrates one embodiment of a method of distributing and updating software in a wireless LAN system using multicast IP. The source host sends the updated information on a specific "channel" corresponding to a multicast IP address such as 225.0.0.98. The data packets sent on the multicast IP address will also be multicast by the AP in their cells. To receive the information, each destination computer such as, mobile unit 15, will have to "tune" to this particular multicast IP address. A feedback channel from the destination computer to the source host may be required for selective re-transmission of data packets that were not receive correctly. The above process conserves network resources such as bandwidth. It also is efficient because the source sends the information only once to all the destination stations.

Figure 9:
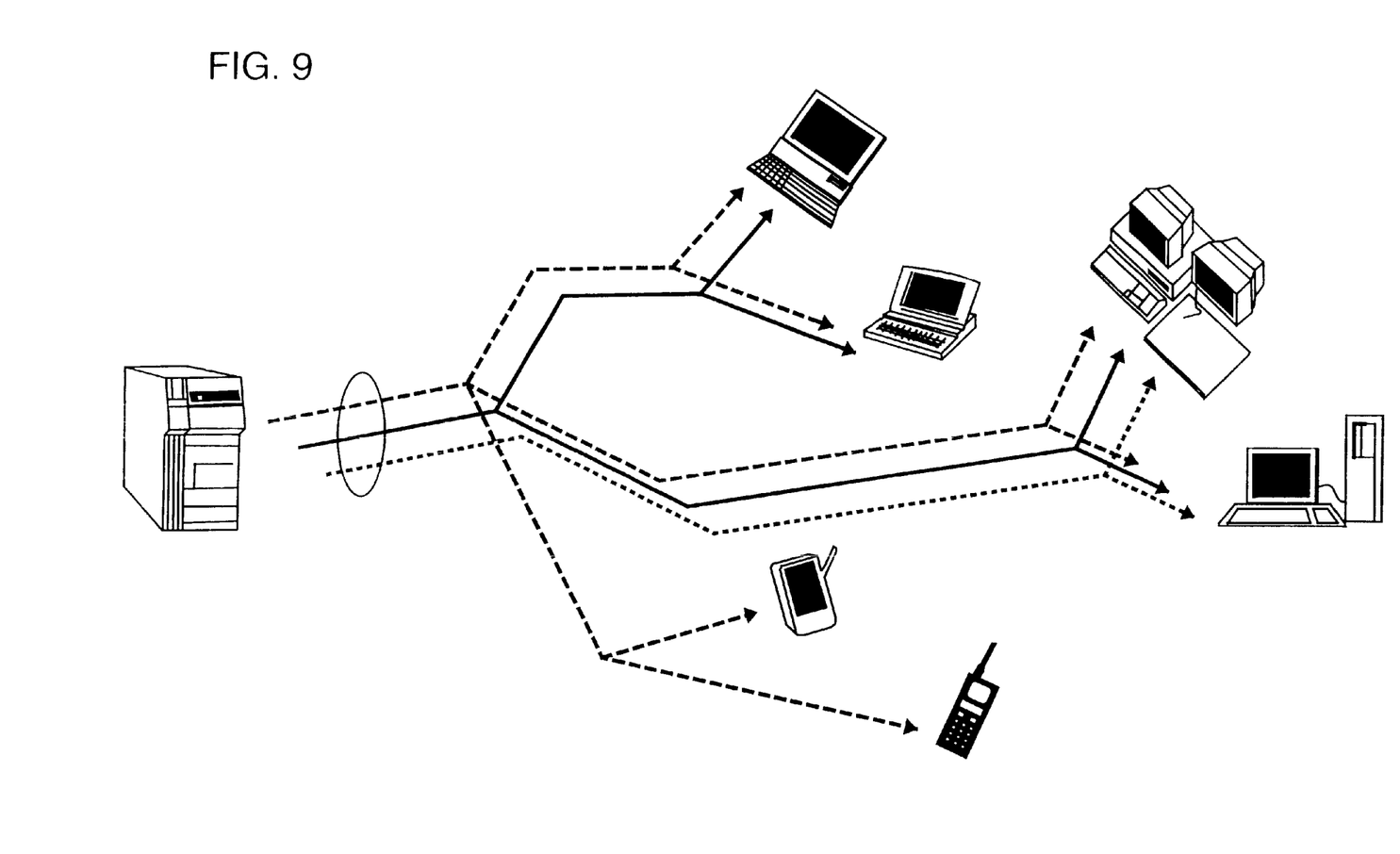
FIG. 9 illustrates a block diagram of a wireless LAN configured for streaming multicast scalable video to heterogeneous computers.

A fourth aspect of the invention is shown in FIG. 9 as a block diagram that illustrates a wireless LAN system configured for streaming multicast scalable video to heterogeneous computers. The source sends multiple layers of coding to the heterogeneous computers where the sum of all the layers equals the largest bit rate stream supported. In one embodiment, the first layer of 64 kps would be sent to the PDA, phones, laptops and workstations. The second layer of 64 Kps would be sent to the laptops and workstations, and the third layer of 128 Kps would be sent to the workstations. Each computer in each group would have to reconstruct the video stream from the layers it receives. Accordingly, each group would receive its dedicated bit-rate, for example, 64 Kps, 128 Kps, and 256 Kps. In other words, every computer receives what it needs. Thus, no bandwidth is wasted and the total bandwidth sent by the source is 256 Kps compared with 448 Kps in the prior art.

Figure 10:
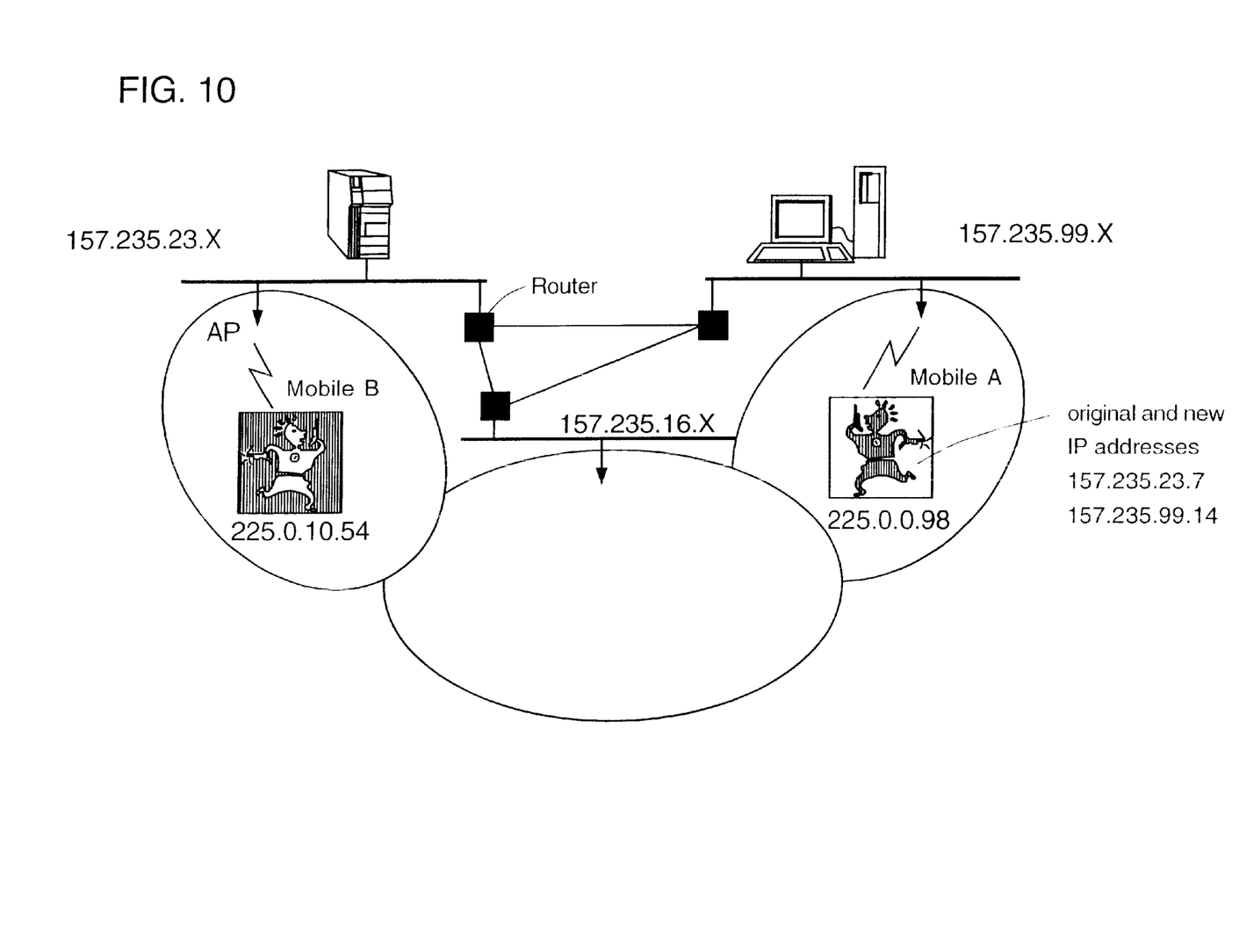
FIG. 10 illustrates a block diagram of a wireless LAN using multicast Internet Protocol (IP) configured for managing mobile phones.

An fifth aspect of the invention is shown in FIG. 10 as a block diagram that illustrates one embodiment of a system for managing mobile phones in a wireless LAN using multicast Internet Protocol (IP). The IP address of each mobile phone is mapped to a multicast IP address. This mapping is made known to the mobility management system in a centralized controller or host computer on the network. When a user on the network desires to communicate with a mobile unit without knowing the location of the unit, it dials its fixed IP address. The mobility management system tracks the mobile unit using its mapped multicast IP address. The location tracking of the mobile unit is instantaneous since its multicast IP address is flooded in all the cells of the wireless LAN. This process will not overload the traffic in the cells because the location inquiry is comprised of a small single packet, such as 32 bytes. The mobile unit receives a new IP address from the foreign network. Once the mobile unit is found, it sends back to the originating call the new IP address and the call proceeds as usual.

In one embodiment, mobile phone A has a fixed IP address 157.235.23.7 with a multicast IP address mapping of 225.0.0.98. It then moves to subnet 157.235.99.X. Mobile phone B wants to call mobile phone A so it dials its fixed IP address 157.235.23.7. This results in a multicast IP packet 225.0.0.98 that is transmitted to the cells in the system. However, mobile phone A is now in subnet 157.235.99.X receives the packet and realizes that mobile phone B wants to communicate. Mobile phone A responds to mobile phone B with its new IP address 157.235.99.14 that was assigned to mobile phone A by subnet 157.235.99.X. The phone conversation proceeds as usual without a delay or a disruption in communication.

Various aspects of the techniques and apparatus may be implemented in digital circuitry, or in computer hardware, firmware, software, or in combinations of them. Apparatus of the invention may be implemented in a computer products tangibly embodied in a machine-readable storage device for execution by a programmable processor. The foregoing techniques may be performed, for example, by a programmable processor executing a program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

A number of embodiments of the invention have been described. Nevertheless, it will be understood that various modifications may be made without departing from the spirit and scope of the invention. Accordingly, other embodiments are within the scope of the following claims.

A number of embodiments of the invention have been described. Nevertheless, it will be understood that various modifications may be made without departing from the spirit and scope of the invention.

What is claimed is:

1. A method of operating a packet data communications network including a plurality of access points and a plurality of remote mobile wireless units, at least two of the mobile units being capable of communicating with at least one of the access points, and when located within a predetermined range there from, being associated with a single one of such access points, comprising:

establishing an association between the mobile units and the access points utilizing a packet frame addressing protocol including a multicast address;

receiving in one of the access points at least two distinct sequences of packets addressed to at least two mobile units respectively associated with the access point;

forming a frame in the access point, with a multicast address including the address of at least two of the mobile units, and including in the data field of the frame unicast packets addressed to each of at least two of the mobile units; and transmitting the frame to the mobile units by the one access point.

2. A method as defined in claim 1, wherein communication between the remote wireless mobile units and the access points includes communication across a network that follows the IEEE.802.11 standard.

3. A method as defined in claim 1, when the mobile unit includes a Windows CE operating system with a Winsock API.

4. A method as defined in claim 1, wherein the mobile unit includes a bar code reader.

5. A method as defined in claim 1, wherein the mobile unit includes a voice communications device.

6. A method as defined in claim 2, wherein the multicast address is defined at the IEEE 802.11 MAC frame level.

7. A method as defined in claim 6, wherein the data field of the IEEE 802.11 MAC frame includes at least two IP packets with different unicast IP addresses.

8. An article comprising a computer-readable medium that stores computer-executable instructions for operating a packet data communications network including a plurality of access points and a plurality of remote mobile wireless units, at least some of the mobile units being capable of communicating with at least one of the access points, and when located within a predetermined range therefrom being associated with a single one of such access points, the instructions comprising instructions causing a computer to:

establish an association between the mobile units and the access points utilizing a packet frame addressing protocol including a multicast address;

receive in one of the access points at least two distinct sequences of packets addressed to at least two mobile units respectively associated with the access point; and form a frame in the access point, with a multicast address including the address of at least two of the mobile units, and including in the data field of the frame unicast packets addressed to each of at least two of the mobile units.

9. An article comprising a computer-readable medium that stores computer-executable instructions for operating a packet data communications network including a plurality of access points and a plurality of remote mobile wireless units, at least some of the mobile units being capable of communicating with at least one of the access points, and when located within a predetermined range therefrom being associated with a single one of such access points, the instructions causing a computer to:

establish an association between the mobile units and the access points utilizing a packet frame addressing protocol including a multicast address;

receive in one of the access points at least two distinct sequences of packets addressed to at least two mobile units respectively associated with the access point;

form a frame in the access point, with a multicast address including the address of at least two of the mobile units, and including in the data field of the frame unicast packets addressed to each of at least two of the mobile units; and transmit the frame to the mobile units by the one access point.

* * * * *